ns Patent Office
2,948,400
Patented Aug. 9, 1960

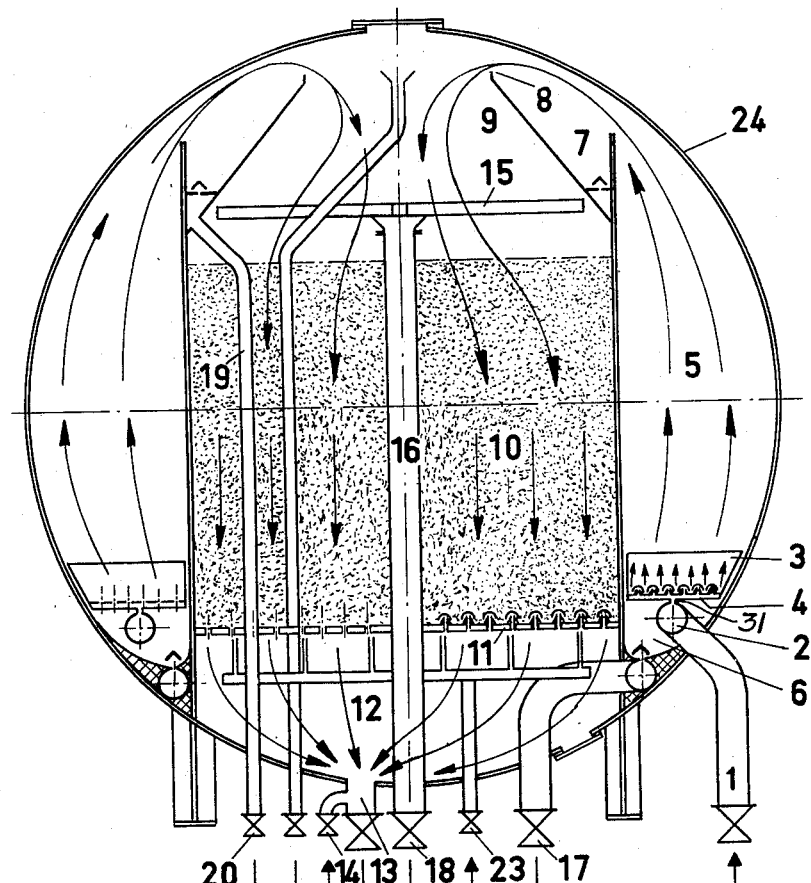
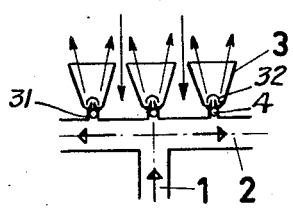
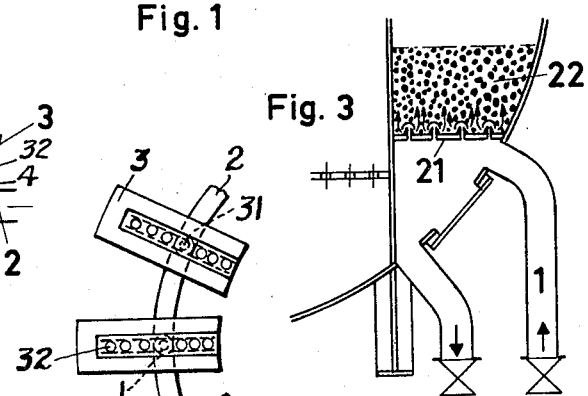
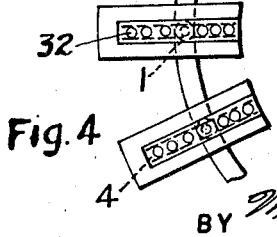

2,948,400

FILTERING APPARATUS

Joseph Hagen, Birsfelden, near Basel, Switzerland, assignor, by mesne assignments, to Saul & Co., Newark, N.J., as nominee of Fidelity Union Trust Company, executive trustee under Sandoz Trust Filed Aug. 27, 1956, Ser. No. 606,375

Claims priority, application Switzerland Sept. 2, 1955

3 Claims. (Cl. 210—256)

The present invention relates to filtering apparatus comprising a flocculation and settling chamber and a filter bed.

Efforts have long been made to render the supply of drinking water and of water for industrial purposes independent of springs and subterranean sources, by subjecting river water or sea water to appropriate purification treatments. Such purification treatments comprise, for example, clarification of the water by means of a strainer followed by treatment with chemical agents or suitable filtering. Arrangements are known wherein the water to be purified flows through two filter beds, one of which is constituted by coarse granular material and the other by fine granular material. The unpurified water to be filtered flows first through the coarse-grained filter and then through the fine-grained filter; the first filter removes most of the suspended matter, while the second filter removes the remainder of such suspended matter.

It has also been attempted to facilitate the separation of the water from suspended matter with the aid of suitable flocculating agents. These flocculating agents function to bring about the agglomeration of the suspended matter into larger particle form, which can then be more efficiently filtered off. Suitable flocculating agents for this purpose are for example ferric chloride, ferrous sulfate and aluminum sulfate. The particular one of these to be employed depends upon the pH-value of the water to be purified; thus, ferric chloride is particularly suitable for the flocculation of suspended matter in water with a pH on the alkaline side, whereas ferrous sulfate is suitable, advantageously in combination with milk of lime, for acid water. In many cases, sodium silicate is added to the flocculating agent to enhance its action.

The water containing the flocculated matter is filtered in conventional manner. It is necessary, from time to time, to remove the retained flocculated matter from the filters. Since this is time-consuming and, moreover, involves undesired interruption of the filtering operation, it has been a desideratum in the art to provide an apparatus which makes it possible, in continuous manner, to eliminate the major portion of the flocculated material prior to the filtration of the water.

The present invention is addressed to the realization of this desideratum. To this end, this invention provides an effective filtering apparatus for use in the purification of raw river water and sea water with the aid of flocculating agents, the characteristic feature of the apparatus being that a flocculating chamber and a settling chamber are provided in one and the same casing anteriorly of a conventional filter for suspended matter. The operation of a so-constructed filtering apparatus is remarkable. Thus, it is possible, by using this apparatus for example with untreated water having a pH between 7 and 8, to remove 94% of the suspended matter flocculated with the aid of ferric chloride as flocculating agent, before such flocculated matter reaches the filter bed, so that the latter has to filter out only 6% of the said flocculated matter. The thus-realized reduction in the number of times which it is necessary to wash out the filter is evident: with the apparatus of the present invention, the filter bed has to be cleaned 16-times less often than is normally the case. Notwithstanding this remarkable functioning of the apparatus provided according to this invention with flocculating chamber and settling chamber, it is also possible to increase the rate of throughflow of the water, as compared with conventional filtering plants. A further advantage of the arrangement according to the invention relative to known arrangements is that the flocculating chamber and settling chamber as well as the filter bed are all disposed in the same casing or housing; with respect to space saving, this is of a significance which is not to be underestimated.

A presently-preferred embodiment of the invention is shown by way of example on the accompanying drawings, wherein Figs. 1 and 2 illustrate, somewhat diagrammatically, the mode of operation of the relationship of parts according to the invention;

Fig. 3 shows modified form of construction, and

Fig. 4 is a plan view of Fig. 2.

As shown in Fig. 1, the water to be treated and to which there has been added a flocculating agent and, as required, other chemicals, e.g. milk of lime, sodium silicate and/or chlorine, enters through conduit 1 into annular conduit 2 (see also Figs. 2 and 4). To the latter, there are connected at the top and in uniform distribution a number of vertical tubes 31, each of which carries a container 3 and a distributing conduit 4. The distributing conduit is provided with nozzles 32. The inflowing water is thus distributed over the entire flocculating chamber 5. The containers 3 receive some flocculated matter so that, upon intermittent operation, flocculated matter is always already present each time the filter is set in operation. This flocculated matter accelerates flocculation in the fresh water.

The water flows into flocculating chamber 5 with continuous formation of flocculated matter upwardly in the vertical direction. The flocculated matter constantly increases in particle size as a result of agglomeration. Due to their size and to their higher specific gravity, relative to water, they partly sink again and, falling between the built-in containers 3, they drop into the lower settling chamber 6. Another portion of the flocculated matter is entrained by the upwardly flowing water and is discharged, due to the change in direction of flow of the water, into the upper settling chamber 7. The water, thus freed of flocculated matter, runs over the upper edge 8 of the settling chamber 7 into the middle chamber 9 of the filter and from here vertically downwardly onto the filter bed 10. During passage through the filter bed 10, which consists of fine-grained material, any suspended matter remaining in the water is removed. The thus filtered water flows through the bottom 11 into the filtered water chamber 12, and from the latter leaves the filtering apparatus through conduit 13.

The flocculated matter collected in the lower settling chamber 6 is from time to time removed in the form of a thick slurry. The level of the slurry can be kept constant with the aid of a selenium cell or any other suitable and per se conventional control device. When the level of the slurry exceeds the predetermined magnitude, the control cell or other control device opens the valve 17 and allows slurry to flow off until its level has dropped below the predetermined magnitude. A similar control and slurry flow-off arrangement is provided in the upper settling chamber 7. When the desired level is exceeded, valve 20 opens for a short time, and the slurry flows out of the filter through conduit 19.

Instead of the ring conduit 2, the containers 3 and the distributing conduits 4, a perforated or nozzle floor 21

(Fig. 3) may be employed. In such case, flocculation can be accelerated by providing a layer 22 of coarse-grained material, for example gas coke, over the nozzle floor 21. In this arrangement, all the flocculated matter has to go to the upper settling chamber, since flocculated matter can not be withdrawn from below. This arrangement, which has to include a device for washing the filter bed, is shown in Fig. 3.

When the filter bed 10 is contaminated to such extent that the filtering action is less than optimum or the filtering resistance exceeds the permissible maximum, valves 23 and 14 are opened and water and air is driven under the filter bed. This air and water mixture passes through the filter bed, removes the contaminating material from the fine granules and floats the removed material upwardly into the chamber above the filter bed 10. From here the highly contaminated wash water flows to the collecting troughs 15 and leaves the chamber through conduit 16 and opened valve 18.

The afore-described filtering arrangement consisting of flocculating chamber, settling chamber and filtering chamber can be built into a cylindrical container. If the diameter of the filter chamber 10 is greater than 2 to 3 meters, it is advantageous to give the outer casing 24 a spherical rather than a cylindrical configuration. The spherical construction makes it possible to reduce the wall thickness, particularly of filtering devices which are under a water pressure of several atmospheres. Since, in the spherical configuration, the ratio of surface to content is most favorable, the choice of this configuration makes possible a considerable saving in material.

Water filtered with the filtering arrangement according to this invention is free of suspended matter and is surprisingly low in bacteria content. Thus, water for example from the Rhine, after treatment according to the present invention corresponds, as regards clarity, to the drinking water of the city of Basel, Switzerland.

Having thus disclosed the invention, what is claimed is:

1. A filtering apparatus, particularly adapted for the filtration of river water and sea water with the aid of flocculating agents, comprising a single outer casing, a filter bed in said casing extending vertically thereof from adjacent the top of said casing all the way to the bottom thereof and having outlet means from said casing in the lower end of said filter bed, a substantially vertical flocculation chamber adjacent said filter bed connected only to the upper end of said filter bed, at least one settling chamber below said flocculation chamber, and liquid distribution means having apertures therein between the lower end of said flocculation chamber and said settling chamber, whereby the water to be filtered flows only upwardly through said flocculation chamber to the filter bed and reversal of flow takes place only after flocculation is complete, and the flocculated matter settles downwardly through the flocculation chamber and through the apertures in said liquid distribution means into said settling chamber.

2. A filtering apparatus as claimed in claim 1 in which said outer casing is spherical in configuration and said filter bed is centrally disposed in said casing, said liquid distribution means positioned between said casing and a point spaced above the lower end of said filter bed, said flocculating chamber being defined between said casing and said filter bed above said liquid distribution means, and said settling chamber being defined between said casing and said filter bed below said liquid distribution means.

3. A filtering apparatus, particularly adapted for the filtration of river water and sea water with the aid of flocculating agents, comprising an outer casing, an inner casing within said outer casing and extending vertically from the bottom of said outer casing to adjacent the top of said outer casing and leaving a passage between said inner and outer casing, a filter bed within said inner casing, said outer and inner casing defining between the walls thereof a vertical flocculation chamber surrounding said filter bed, a wall extending around the upper end of said inner casing and connected thereto at a point spaced below the top of said inner casing, said wall extending to a point adjacent said outer casing and leaving a further passage between said wall and said outer casing, said wall and said inner casing above the point where said wall is joined thereto defining a secondary settling chamber between said passages, said flocculation chamber and said filter bed being in communication only through said passages and said secondary settling chamber, a primary settling chamber below said flocculation chamber, and a liquid distribution means having apertures therein between the lower end of said flocculation chamber and said settling chamber, whereby the water to be filtered flows only upwardly through said flocculation chamber, through the passages and to the filter bed, and the flocculated matter settles downwardly through the flocculation chamber and through the apertures in said liquid distribution means into said primary settling chamber and also settles into said secondary settling chamber during the flow between the two passages.

References Cited in the file of this patent

UNITED STATES PATENTS

| | | |
|---|---|---|
| 1,149,750 | Greth et al. | Aug. 10, 1915 |
| 1,398,285 | Tanner | Nov. 29, 1921 |
| 1,898,812 | Bressel et al. | Feb. 21, 1933 |
| 2,147,422 | Bendz | Feb. 14, 1939 |
| 2,364,775 | Brice | Dec. 12, 1944 |
| 2,588,863 | McCurdy | Mar. 11, 1952 |